United States Patent Office 3,248,313
Patented Apr. 26, 1966

3,248,313
ISOMERIZATION OF CYCLODODECATRIENE
Donald L. Crain, Bartlesville, Okla., assignor to Phillips Petroleum Company, a corporation of Delaware
No Drawing. Filed July 26, 1961, Ser. No. 126,890
5 Claims. (Cl. 204—154)

This invention relates to the isomerization of cyclododecatriene. In another aspect, it relates to a method of isomerizing trans,trans,cis-1,5,9-cyclododecatrienes to the corresponding trans,trans,trans-isomer.

It has recently been discovered by others that conjugated dienes, such as 1,3-butadiene, can be trimerized to produce trans,trans,cis-1,5,9-cyclododecatrienes. For example, it is known that 1,3-butadiene can be trimerized in the presence of an organoaluminum compound, such as triethylaluminum, and a metal halide, such as titanium tetrachloride, to produce trans,trans,cis-1,5,9-cyclododecatriene, a compound which is a liquid at room temperature and has a boiling point of 100–110° C. at 11 mm. Hg absolute pressure.

I have discovered that these trans,trans,cis-1,5,9-cyclododecatrienes can be isomerized to the corresponding trans,trans,trans-isomers by a method which comprises contacting said trans,trans-cis-cyclotriene with anhydrous hydrogen bromide or anhydrous hydrogen iodide in the presence of ionizing and ultraviolet radiation. The conversion of the trans,trans,cis-cyclotriene to the all trans cyclododecatriene isomer proceeds at rapid rates and results high yields.

In addition to the all trans cyclotriene isomer formed by the conversion of this invention, there is also formed the corresponding 9-halo-1,5-cyclododecadiene, such as 9-bromo- or 9-iodo-1,5-cyclododecadiene. The amount of this halo derivative, which can be considered as a by-product of the isomerization reaction, will vary and depend on the relative amount of hydrogen halide used and the pressure and temperature under which the reaction is carried out.

The invention is particularly useful in converting trans,trans,cis-1,5,9-cyclododecatriene to the corresponding trans,trans,trans-isomer, and to the 9-halo-1,5-cyclododecadiene derivative thereof. However, trans,trans,cis-1,5,9-cyclododecatrienes of the general formula

$C_{12}H_{15}R_3$ where each of the three R's is a hydrogen or a methyl group, are generally applicable, including the trimethyl trans,trans,cis-1,5,9-cyclododecatriene formed by trimerization of isoprene and piperylene (1,3-pentadiene). In the case of the isoprene trimer, each of the three methyl groups is attached to a carbon atom which in turn is attached to another carbon atom by a double bond. In the case of the piperyline trimer, each of the methyl groups is attached to carbon atoms which in turn are attached to other carbon atoms by single bonds.

The actinic radiation which can be used in carrying out the method of this invention will generally have a potential or energy level in the range of 3.1 to $1 \times 10^8$ electron volts. The radiation dose rate will generally be from $10^3$ to $10^7$ roentgens equivalent physical per hour (rep./hr.), and the total radiation dosage will generally be from $10^5$ to $10^{11}$ reps., preferably $10^7$ to $10^9$ reps. Lower radiation rates can be used but are not practical from a time standpoint since the rate of reaction will be correspondingly slow, and higher rates, although usable, are difficult to attain and are not necessary in the practice of this invention. The radiation dosages and rates, as used herein, are internal or actual dosages and rates received by the reaction system. The unit of roentgen equivalent physical corresponds to an absorption of 93 ergs/gram of material, the material being water, hydrocarbon or rubber which have very nearly the same absorption co-efficients. The unit of roentgen equivalent physical is also equal to $5.80 \times 10^{13}$ electron volts.

Actinic radiation useful in the practice of this invention include activating rays such as ultraviolet rays having a wavelength in the range of 100 to 3800 Angstroms, and ionizing rays such as alpha rays, beta rays, gamma rays, X-rays, deuterons, protons, and neutrons. The ultraviolet rays can be supplied from lamps or other apparatus which are available for generation of such days. Sources of ionizing radiation include electrical devices such as cathode tubes, which produce electrons, and various accelerators, such as cyclotrons, synchrotrons, betatrons, which produce electrons, protons, deuterons and alpha particles. The natural and artificial radio-active elements can also be used as sources of radiation. The radioactive isotopes of radium, thorium, bismuth, palladium, cobalt, phosphorus, strontium, and the like can be used as a source of rays. Spent fuel elements can also be used as radiation sources, particularly since they are a low cost source of ionizing radiation. Still another source of ionizing radiation are the highly energetic fragments which result at the moment of fission.

The amount of hydrogen halide which will be employed can also vary over a wide range, but the mole ratio of the hydrogen halide to the cyclic triene will generally range from 0.01 to 10. As will be shown hereinafter, bromo- and iodo-derivatives of the cyclic trienes are formed in minor amounts in the isomerization process of this invention. Accordingly, the amount of hydrogen halide which will be employed will depend upon the amount of halo derivative which it is desired to produce. If production of the halo derivative is to be minimized, mole ratios of hydrogen halide to cyclic triene will generally be less than 0.2. Higher mole ratios cause formation of larger quantities of the halo derivatives.

The contacting of the cyclic triene with either HBr or HI in the presence of ionizing and ultraviolet radiation can be carried out over a wide range of temperatures, generally at a temperature within the range between $-50°$ and $200°$ C., preferably between $0°$ and $100°$ C. The reaction can be carried out in the liquid phase or in the vapor phase, although liquid phase operation is generally preferred. The pressure in the reaction zone can be either the autogenous pressure developed by the reaction mixture at the temperature being employed or superatmospheric pressure can be applied by external means. Increased pressure favors the formation of the halo derivatives, and if formation of these materials is to be minimized, it should be advantageous to operate at as low a pressure as possible to obtain adequate reaction rates.

The reaction can be carried out in the presence or absence of a solvent or reaction diluent. Generally, any reaction diluent which is inert with respect to the hydrogen halide being employed can be used. Preferred solvents include alkanes, cycloalkanes, and aromatic hydrocarbons containing from three to ten carbon atoms. Also, halo hydrocarbons can be used as reaction diluents. Some specific examples of reaction diluents or solvents are propane, isobutane, n-pentane, isooctane, n-decane, cyclohexane, methylcyclohexane, benzene, toluene, chlorobenzene, tetrachloroethane, and the like.

In preparing the all trans cyclic triene, and the 9-halo-1,5-cyclododecadiene derivatives thereof, I have found it essential to use both the hydrogen halide and ionizing and ultraviolet radiation, as will be apparent from the examples discussed hereinafter.

The following examples further illustrate the objects and advantages of this invention, but it should be understood that the various ingredients or reactants, amounts, temperatures, pressures, and other conditions recited in these examples should not be construed so as to unduly limit this invention.

Example I

In this example, 167 ml. of cyclohexane and 64 g. (0.4 mole) of trans,trans,cis-1,5,9-cyclododecatriene were charged to a 500 ml., 3-necked quartz flask fitted with a stirrer, condenser, and a gas inlet. A cylinder of anhydrous HBr was attached to the gas inlet, and the flow rate of the HBr was first standardized by passing the HBr through a flow meter at a constant rate and adsorbing the gas in a 0.1 N standard base solution containing phenolphthalein. By this method, 2 minutes of gas flow was required to neutralize 50 ml. of 0.5 N aqueous sodium hydroxide. Thus, the flow rate of HBr was 0.005 mole per minute.

After charging the cyclic triene and cyclohexane to the flask, the solution was stirred and purged by passing a stream of nitrogen through the solution. About 0.075 g. of $\alpha,\alpha'$-bisazodiisobutyronitrile was then added to the solution and the flask contents were then irradiated with a 100–125 watt mercury vapor lamp while passing anhydrous HBr into the solution at the above specified rate.

After charging 0.3 mole of HBr (65 minutes), the system was purged with nitrogen to remove the unreacted HBr. The solvent was then evaporated, and the remaining material was fractionated at reduced pressure. The results of this fractionation are expressed as Table I.

TABLE I

| Cut | Boiling pt. of cut, °C. | Pot temp., °C. | Pressure, mm. Hg abs. | Wt. of cut, g. | $n_D^{20}$ |
|---|---|---|---|---|---|
| 1 | 40–42 | 86 | 0.18 | 12.5 | 1.5033 |
| 2 | 40–41 | 86 | 0.18 | 13.1 | 1.5040 |
| 3 | 40–41 | 88–89 | 0.18 | 12.8 | 1.5046 |
| 4 | 38–45 | 85–110 | 0.08–2.1 | 6.0 | -------- |
| 5 | 64–82 | 71–92 | 0.1 | 6.8 | -------- |
| 6 | 82–94 | 92–130 | 0.1 | 12.7 | -------- |

Cuts 1, 2, 3, and 4 from the fractionation were then analyzed by gas chromatography. The results of these analyses are expressed as Table II.

TABLE II

| Cut | Amounts of components in cut | | | | | |
|---|---|---|---|---|---|---|
| | Trans,trans,cis-1,5,9-cyclododecatriene | | Unknown A | | Unknown B | |
| | G. | Wt. percent | G. | Wt. percent | G. | Wt. percent |
| 1 | 3.96 | 31.6 | 8.54 | 68.4 | ---- | ---- |
| 2 | 4.60 | 35.1 | 8.07 | 61.6 | 0.43 | 3.3 |
| 3 | 5.84 | 45.6 | 6.30 | 49.2 | 0.67 | 5.2 |
| 4 | 3.21 | 40.8 | 2.45 | 53.5 | 0.34 | 5.7 |
| | 17.61 | | 25.36 | | 1.44 | |

Cut 1 was further characterized by hydrogenation of a 0.2762 g. sample of Cut 1 in acetic acid with a reduced platinum oxide catalyst at 736 mm. and 25° C. This hydrogenation resulted in the absorption of 133.6 ml. of hydrogen, which is equivalent to three double bonds based on the molecular weight of the starting material. The hydrogenation solution was filtered, the filtrate poured into water, the aqueous mixture extracted with pentane, and the pentane extracts washed with sodium bicarbonate solution, dried, and evaporated to a small volume. Gas chromatographic analysis of the solution showed that it was a mixture of pentane and cyclododecane. The pentane was distilled off, and the white crystalline solid which melted at 60–62° C. was obtained. The literature value for the melting point of cyclododecane is 61–62° C. It is evident that Unknown A, the major component in Cut 1, is a 1,5,9-cyclododecatriene isomer.

When samples of Cuts 1, 2, and 3 were cooled, a solid crystallized in long needles. This indicated that these cuts contained the trans,trans,trans-1,5,9-cyclododecatriene isomer, a solid at room temperature.

Example II

Another run was carried out by the method of Example I except that the azo compound was omitted. The apparatus and procedure employed were identical to Example I except that 81 g. of trans,trans,cis-1,5,9-cyclododecatriene and 175 ml. of cyclohexane were used and the anhydrous HBr was passed through the stirred solution under ultraviolet radiation for 2 hrs. The products were worked up in the same manner as in Example I, leaving a total pot residue of 3.5 g. The results of the fractionation are expressed as Table III. Samples of Cuts 1 and 2 crystallized on cooling, indicating presence of the all trans isomer.

TABLE III

| Cut | Boiling pt. of cut, °C. | Pot temp., °C. | Pressure, mm. Hg abs. | Wt. of cut, g. | $n_D^{20}$ |
|---|---|---|---|---|---|
| 1 | 83 | 105–114 | 5.3 | 27.6 | -------- |
| 2 | 83 | 114–135 | 5.3 | 15.1 | -------- |
| 3 | 48–72 | 125–126 | 0.4 | 5.9 | -------- |
| 4 | 72–82 | 126–138 | 0.4 | 5.4 | -------- |
| 5 | 79–80 | 138–140 | 0.17 | 19.4 | 1.5322 |
| 6 | 80+ | 140–175 | 0.17 | 12.7 | 1.5322 |

Cuts 1 and 2 of the fractionation were analyzed by gas chromatography and the results obtained are set forth in Table IV.

TABLE IV

| Cut | Amounts of components in cut | | |
|---|---|---|---|
| | Trans,trans,cis-1,5,9-cyclododecatriene, wt. percent | Unknown A, wt. percent | Unknown B, wt. percent |
| 1 | 19.7 | 78.9 | 1.4 |
| 2 | 33 | 63.8 | 3.2 |

Cut 1 was cooled slowly in a water bath, whereupon a solid crystallized. The material was then cooled to 5° C. for 24 hrs. and the liquid was decanted off of the crystals. A total of 2.9 g. of liquid was obtained. Since Cut 1 weighed 27.6 g. and contained 78.9 wt. percent of one component, it is apparent that the crystalline material is Unknown A. It is also apparent that additional liquid material is entrained in th crystals, since there should have been 5.8 g. of liquid removed. The crystals from this crystallization were diluted with 10 ml. of absolute ethanol, and the resulting solution was cooled very slowly by placing the flask in shallow water and slowly decreasing the temperature by periodically adding ice. When the water bath reached 8° C., the flask and its contents were refrigerated at 5° C. for 14 hrs. The supernatant liquid was decanted off and crystallization was repeated. The crystals were melted and subjected to gas chromatography, and the analysis revealed that the sample contained 12.4 wt. percent of cyclic triene and 88.6 wt. percent of Unknown A. The sample was then recrystallized twice from 50 ml. of ethanol at 10° C., and 9 g. of white crystals were obtained, melting at 33–34° C. A gas chromatographic analysis of this sample showed that it contained 4.1 wt. percent of cyclic triene and 95.9 wt. percent of Unknown A. The infrared spectrum of this sample showed a weak absorbence for the cis band and a very strong absorbence for the trans band. Since the literature value of the melting point for trans,trans,trans-1,5,9-cyclododecatriene is given as 34° C., and in view of the infrared spectrum, it is apparent that the crystalline material was Unknown A and that it was the all trans isomer of 1,5,9-cyclododecatriene.

A 0.2465 g. sample of Cut 5 from the fractionation was hydrogenated at 24-25° C. and 746 mm. pressure in glacial acetic acid using a reduced platinum oxide catalyst. The volume of hydrogen absorbed was 54.5 ml., which corresponds to 2.07 double bonds assuming the mono-addition product of HBr with the cyclic triene. The infrared spectrum of this material showed a band for the trans double bonds. A silver nitrate test with a sample of Cut 5 gave a positive test for bromine. It is apparent that Cut 5 contained the mono-addition product of HBr and the cyclic triene.

*Example III*

In a control run, the procedure of Example I was repeated using 0.4 mole of trans,trans,cis-1,5,9-cyclododecatriene and 0.3 mole of anhydrous HBr, but no ultraviolet light. After fractionating the reaction mixture, gas chromatographic analysis showed that the cyclic triene starting material was unaffected by the reaction conditions.

In another control run, the procedure of Example I was followed (without use of the azo compound) in that a cyclohexane solution of the cyclic triene starting material was irradiated with ultraviolet light for 1 hr. in the absence of HBr. After the cyclic triene had been irradiated with ultraviolet light in the absence of HBr for 1 hr., a sample was withdrawn which was analyzed. Gas chromatographic analysis of the product from this run showed it to be identical with starting material. After this sample was withdrawn, anhydrous HBr was then passed through the solution under ultraviolet light irradiation at 0.005 mole per minute for 1 hr. After evaporating off the solvent, the product was fractionated in the manner of Example I. Gas chromatographic analysis of the products after HBr addition showed identical retention times to the products of Example I. A 30.3 g. cut from the fraction which boiled at 89–91° C. and had a refractive index of $n_D^{20}$ 1.5057 was analyzed by gas chromatography and found to contain 36.5 wt. percent of the all trans isomer of 1,5,9-cyclododecatriene, 60.6 wt. percent of trans,trans,cis-1,5,9-cyclododecatriene and 2.9 wt. percent of Unknown B.

The runs show that neither ultraviolet nor anhydrous hydrogen halide alone have any effect on trans,trans,cis-1,5,9-cyclododecatriene. This is further emphasized in that ultraviolet light alone had no effect on trans,trans,cis-1,5,9-cyclododecatriene, but when anhydrous hydrogen halide was added to the reaction mixture, isomerization resulted in a fairly short time.

*Example IV*

In this example, the procedure of Example I is repeated (without use of the azo compound) using 1,5,9-trimethyl-trans,trans,cis-1,5,9-cyclododecatriene, the symmetrical cyclic trimer of isoprene. Fractionation of the resulting reaction mixture yields a substantial amount of 1,5,9-trimethyl-trans,trans,trans-1,5,9-cyclododecatriene, and a minor amount of the corresponding mono-bromo derivative.

*Example V*

The procedure of Example I is repeated (without use of the azo compound) using 3,7,11-trimethyl-trans,trans,cis-1,5,9-cyclododecatriene, the symmetrical cyclic trimer of piperylene, and anhydrous HI. Fractionation of the resulting reaction mixture yields a substantial amount of 3,7,11-trimethyl-trans,trans,trans-1,5,9-cyclododecatriene and a minor amount of the corresponding mono-iodo derivative.

The trans,trans,trans-1,5,9-cyclododecatrienes produced according to this invention are known to have utility in many organic synthesis. For example, they can be converted into lactams, raw materials used in the manufacture of synthetic plastic products such as polyamides, or they can be hydrogenated to cyclododecane or to cyclododecene, which hydrogenated products can be oxidized to the corresponding dicarboxylic acids, the latter being useful in the preparation of said polyamides. It has also been recently discovered that such cyclotriene hydrocarbons can be treated with such materials as concentrated sulfuric acid, an acid of phosphorus supported on a solid absorbent, polyphosphoric acid, boron trifluoride, and boron trifluoride hydrates to produce a mixture of polycyclic hydrocarbons useful as fuels for jet engines and other continuous combustion type power plants. The corresponding 9-bromo or 9-iodo-1,5-cyclododecadiene derivatives can be employed as intermediates in many organic synthesis or they can be employed as solvents. These halo derivatives exhibit higher boiling points than the corresponding cyclic triene precursors, and they have decreased flammability. In addition, such halo derivatives can be used in pesticidal compositions, such as insecticides.

Various modifications and alterations of this invention will become apparent to those skilled in the art from the foregoing discussion, without departing from the scope and spirit of this invention, and it should be understood that this invention is not to be limited unduly to the preferred embodiments set forth herein for illustrative purposes.

I claim:

1. A method for forming trans,trans,trans-1,5,9-cyclododecatriene, said method comprising the steps of contacting a trans,trans,cis-1,5,9-cyclododecatriene having the general formula $C_{12}H_{15}R_3$, where R is selected from the group consisting of hydrogen and methyl, with an anhydrous hydrogen halide selected from the group consisting of hydrogen bromide and hydrogen iodide in the presence of ionizing radiation, maintaining a mol ratio of less than 0.2 between said hydrogen halide and said cyclododecatriene and recovering trans,trans,trans-1,5,9-cyclododecatriene from the resulting reaction mixture.

2. The method according to claim 1 wherein said hydrogen halide is hydrogen bromide.

3. A method for forming trans,trans,trans-1,5,9-cyclododecatriene, said method comprising the steps of contacting trans,trans,cis-1,5,9-cyclododecatriene with anhydrous hydrogen bromide in the presence of α,α'-bisazodiisobutyronitrile and ionizing radiation; maintaining a mol ratio of less than 0.2 between the hydrogen bromide and the cyclododecadiene and recovering trans,trans,trans-1,5,9-cyclododecatriene from the resulting reaction mixture.

4. A method for forming trans,trans,trans-1,5,9-cyclododecatriene, said method comprising the steps of contacting a trans,trans,cis-1,5,9-cyclododecatriene having the general formula $C_{12}H_{15}R_3$, where R is selected from the group consisting of hydrogen and methyl, with an anhydrous hydrogen halide selected from the group consisting of hydrogen bromide and hydrogen iodide in the presence of an ultraviolet radiation having a wave length in the range of 100 to 3800 Angstroms, maintaining a mol ratio of less than 0.2 between said hydrogen halide and said cyclododecatriene and recovering trans,trans,trans-1,5,9-cyclododecatriene from the resulting reaction mixture.

5. A method for forming trans,trans,trans-1,5,9-cyclododecatriene, said method comprising the steps of contacting trans,trans,cis-1,5,9-cyclododecatriene with anhydrous hydrogen bromide in the presence of α,α'-bisazodiisobutyronitrile and an ultraviolet radiation having a wave length in the range of 100 to 3800 Angstroms; maintaining a mol ratio of less than 0.2 between the hydrogen bromide and the cyclododecadiene and recovering trans,trans,trans-1,5,9-cyclododecatriene from the resulting reaction mixture.

(References on following page)

References Cited by the Examiner

UNITED STATES PATENTS

| | | | |
|---|---|---|---|
| 2,058,466 | 10/1936 | Kharasch | 204—163 |
| 2,307,552 | 1/1943 | Vaughan et al. | 204—163 |
| 2,398,481 | 4/1946 | Vaughan et al. | 204—163 |
| 2,964,574 | 12/1960 | Wilke | 260—666 |
| 2,979,543 | 4/1961 | Wilke et al. | 260—666 |
| 3,007,974 | 11/1961 | Lippincott | 260—648 |
| 3,025,329 | 3/1962 | Gleason | 260—648 |

JOHN H. MACK, *Primary Examiner*.

ALPHONSO D. SULLIVAN, WINSTON A. DOUGLAS,
*Examiners.*